Nov. 16, 1926.  1,607,204
C. J. LINZMAIER
TONGS
Filed April 15, 1926
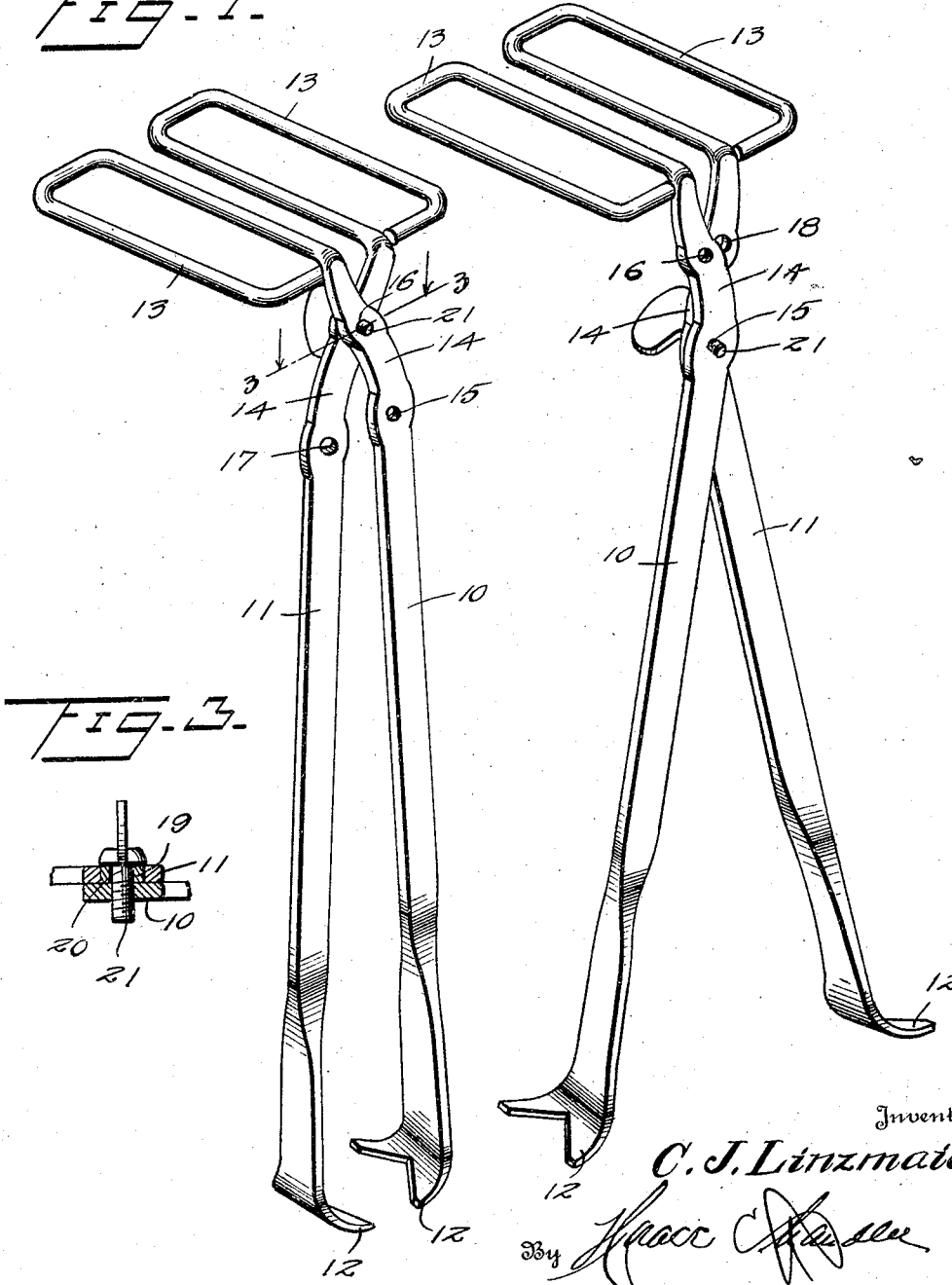

Patented Nov. 16, 1926.

1,607,204

UNITED STATES PATENT OFFICE.

CHARLES J. LINZMAIER, OF BLENKER, WISCONSIN.

TONGS.

Application filed April 15, 1926. Serial No. 102,269.

This invention relates to new and useful improvements in tools, and particularly to tongs.

One object of the invention is to provide a pair of tongs which are capable of adjustment so as to permit removing articles, such as pickles, olives, and the like, from jars.

Another object is to provide a device of this character which is capable of adjustment whereby to permit the same to hold a cloth, with which the inside of a jar, or like receptacle, may be cleaned.

Another object is to provide a device of this character wherein the handles are so arranged that the hand which grasps the same will be out of the way of steam arising from a tube, or other receptacle, in which clothes, in hot water, are contained, in the use of the device for lifting clothes therefrom.

Other objects and advantages will be apparent from the following description when taken in connection with the accompanying drawing.

In the drawing:

Figure 1 is a perspective view of the tongs in position for use to remove articles from a jar.

Figure 2 is a similar view, showing the tongs in position for retaining a cloth for the purpose of cleaning the interior of a jar.

Figure 3 is a section on the line 3—3 of Figure 1.

Referring particularly to the accompanying drawing, 10 and 11 represent a pair of shanks, each having an angularly turned jaw 12, on one end, and a loop handle 13, on its other end. The handle 13 is extended at right angles, out of the plane of the body of the shank, so that when the device is used for lifting hot clothes from a boiler, or meat from a pot, the handles will be disposed outwardly of the receptacle, so that arising steam will not come into contact with the hand which grasps the handles. The portion of each shank, adjacent the handle, is bent at an obtuse angle, as shown at 14, but within the plane of the shank. Formed in the angle of the shank 10 is a threaded opening 15, and between said opening, and said handle, there is formed a second threaded opening 16. In the angle of the shank 11 there is formed an opening 17, of smooth bore, and of slightly greater diameter than the opening 15, and in the shank, between the opening 17, and the handle, there is formed a second opening 18, of like size and character. Removably disposed in the opening 18, when the device is used, as shown in Figure 1, is a sleeve 19, and disposed through this sleeve is the smooth portion 20 of the pivot screw 21, said screw having its threaded end engaged in the opening 16, whereby the two shanks are connected together for pivotal movement, and manipulation to lift an object from a jar. In this position the jaws 12 extend inwardly toward each other. Upon removing the screw and sleeve, and inserting the same in the opening 17, so that the threaded end of the screw enters the opening 15, with the shanks so arranged that the jaws extend away from each other, the operator may place a piece of cloth around the jaws, and after inserting the jaws within a jar to be cleaned, press the handles together, the jaws will be moved apart to stretch the cloth, and thereby permit the proper cleaning of the jar.

What is claimed is:

1. Tongs comprising a pair of shanks each having a terminal jaw, and each having a terminal handle, and means for pivotally connecting the shanks and disposable through different portions of the shanks whereby to dispose the jaws in inwardly or outwardly directed positions.

2. Tongs comprising a pair of shanks each having an angularly extending jaw on one end and a handle on the other end, said shanks having a plurality of pivot receiving openings, and a pivot interchangeably engageable in said opening whereby to permit the said jaws to extend inwardly toward each other, at times, and away from each other, at times.

3. Tongs comprising a pair of shanks each having an angularly extending jaw at one end and a handle on the other end, that portion of each shank adjacent the handle being extended at an obtuse angle within the plane of the shank, openings in said portions of the shanks at the angles and adjacent the said handles, respectively, and a removable pivot member interchangeably engageable in the openings at the angles and the openings adjacent the handles, whereby the shanks may be connected in such relation that the jaws extend toward each other, at times, and away from each other, at times.

4. Tongs comprising a pair of crossed shanks each having an angularly extending jaw at one end and an angularly extending handle at the other end, that portion of each shank adjacent the handle being extended at an obtuse angle in the plane of the shank, the angle of one shank having a threaded opening and the corresponding portion of the other shank having an unthreaded opening, the first shank having a threaded opening adjacent the handle thereof and the corresponding portion of the other shank having an unthreaded opening, and a pivot screw member engaged through an unthreaded opening and threaded into a corresponding threaded opening, whereby the shanks are capable of adjustment into positions where the jaws extend toward each other, at times, and away from each other, at times.

In testimony whereof, I affix my signature.

CHARLES J. LINZMAIER.